United States Patent [19]
Bredbeck

[11] Patent Number: 5,522,559
[45] Date of Patent: Jun. 4, 1996

[54] RUBBER CRUMBING APPARATUS

[75] Inventor: Donald H. Bredbeck, Houston, Tex.

[73] Assignee: Hahn & Clay, Houston, Tex.

[21] Appl. No.: 229,727

[22] Filed: Apr. 19, 1994

[51] Int. Cl.$^6$ ........................................................ B02C 7/14
[52] U.S. Cl. .................................... 241/259.1; 241/261.1; 241/DIG. 31
[58] Field of Search .............................. 241/257.1, 258, 241/259.1, 259.2, 261.1, DIG. 31

[56] References Cited

U.S. PATENT DOCUMENTS

| | | | |
|---|---|---|---|
| 408,515 | 8/1889 | Phillips | 241/261.1 |
| 2,954,938 | 10/1960 | Higer | 241/261.1 X |
| 3,347,295 | 10/1967 | Feiling | 241/261.1 X |
| 4,973,003 | 11/1990 | Chen | 241/261.1 X |

FOREIGN PATENT DOCUMENTS

| | | | |
|---|---|---|---|
| 388878 | 5/1973 | U.S.S.R. | 241/261.1 |
| 368878 | 5/1973 | U.S.S.R. | 241/261.1 |
| 1151302 | 4/1985 | U.S.S.R. | 241/261.1 |
| 1175553 | 8/1985 | U.S.S.R. | 241/261.1 |
| 2044631 | 10/1980 | United Kingdom | 241/261.1 |

OTHER PUBLICATIONS

McGraw–Hill Encyclopedia of Science & Technology, Copyright ©1982, 1977, 1971, 1966, 1960; "Crushing and pulverizing", 3 cover pgs., pp. 744–749 (9 pgs. total).

Encyclopedia Of Chemical Technology, vol. 19, Copyright ©1982, "Recycling (Rubber)", 3 cover pgs., pp. 1002–1010 (12 pgs. total).

*Primary Examiner*—Timothy V. Eley
*Attorney, Agent, or Firm*—Pravel, Hewitt, Kimball & Krieger

[57] ABSTRACT

A rubber crumbing apparatus and method for making crumb rubber from tire chips is disclosed. The rubber crumbing apparatus comprises a frame assembly, a first cone assembly including a truncated cone having an interior surface and an opening extending therethrough, and a second cone assembly positioned substantially within the first cone assembly. The second cone assembly includes a truncated cone having an exterior surface in opposing relationship to interior surface of the first truncated cone. The second cone assembly rotates relative to the first cone assembly. A plurality of crumber blades are connected to one of the opposing surfaces and a plurality of beads are attached to the other opposing surface of the truncated cones. The crumber blades are in close proximity to said beads without contacting said beads as the second cone assembly rotates relative to the first cone assembly. Tire chips are fed between the truncated cones. The close proximity of the crumber blades and the beads as the second cone assembly rotates tears the rubber from the tire chips to make crumb rubber.

18 Claims, 5 Drawing Sheets

RUBBER CRUMBING APPARATUS

BACKGROUND OF THE INVENTION

1. Field of the Invention

The present invention relates to tire recycling, and more particularly to processing rubber tires into crumb rubber.

2. Description of the Prior Art

The United States alone generates approximately 200,000,000 scrap tires per year. An extremely large percentage of these tires end up in landfills, whereas only a small percentage are recycled.

Efforts have been made to find uses for scrap whole tires to minimize the inundation of scrap tires at landfills. Some of the uses for the scrap whole tires include artificial fishing reefs, oyster beds, floating breakwaters, and impact absorbers around highway and bridge abutments. Whole or cut up portions of scrap tires are also used in playgrounds, flower planters, shoe soles, gaskets, shims, dock bumpers, shock absorbers and floor mats. Whole tires and shredded tire chips may also be burned and used as fuel. Reclaimed rubber is also used in asphalt for roadways.

Notwithstanding the above uses for scrap tires, the plain fact remains that still only a very small percentage of scrap tires end up anywhere but in landfills.

One of the problems associated with reclaiming rubber from scrap tires is that bead wire, steel belts and fiber are embedded in the rubber. Removing the bead wire, steel belts and fiber from the rubber is a costly process, however, reclaimed crumb rubber with the bead wire, steel belts and fiber removed has far many more uses and a value of more than tenfold that of crumb rubber without the bead wire, steel belts and fiber having been removed.

Typically, tires are reclaimed by mechanically grinding the tires into crumb rubber having relatively uniform particle size. Crumb rubber particles passing through a 10-mesh screen or finer are often desired. A 10-mesh screen is one having 10 open spaces per linear inch. Reducing the rubber to this size typically requires several milling steps.

Typically, tires are mechanically ground with a two-roll, grooved rubber mill in which the two mill rolls turn at different rates to provide the shearing action necessary to rip the tire apart. Oftentimes, a tire slitter is used to cut the tire initially. The shredded rubber chunks are screened and the larger chunks are recycled until the desired size is reached. Tire bead wire is removed with magnets or by hand. During intermediate operations, tire fiber is removed with hammermills, reel beaters, and air tables that blow a steady stream of air across the rubber, thus separating the fiber. The separated fiber is blown into collectors and baled. The tire grinding process is very energy intensive.

Cryogenics has also been used in conjunction with mechanical action to make crumb rubber. The rubber is cooled below the glass transition temperature with nitrogen, and the brittle rubber is pulverized in a grinding mill. Whole tires have also been pyrolyzed in a reactor having a tilting grate to discharge the steel belt and bead wire of the tires.

It is desirable to have a dependable, durable and high quality rubber crumbing apparatus which can process shredded steel belted tires into crumb rubber from shredded tire chips. It is also desirable that the rubber crumbing apparatus be capable of producing crumb rubber which will pass through a 10-mesh screen. It is further desirable that the rubber crumbing apparatus be capable of removing steel and fiber from the tire chips to produce a high quality, very usable crumb rubber. It is also desirable that the rubber crumbing apparatus be adjustable to produce various sizes of crumb rubber and be designed to facilitate field maintenance, if required.

SUMMARY OF THE PRESENT INVENTION

The present invention is a rubber crumbing apparatus and method of processing steel belted tires into crumb rubber from shredded tire chips. The rubber crumbing apparatus is capable of producing crumb rubber which will pass through a 10-mesh screen or finer. The rubber crumbing apparatus includes an adjustment feature to vary the fineness of the rubber crumbs over a certain range. The rubber crumbing apparatus is capable of removing the wire bead, steel belts and fiber from the tire chips to produce a high quality, very usable crumb rubber.

The rubber crumbing apparatus comprises a frame assembly having first and second cone assemblies mounted thereon. The second cone assembly is substantially positioned within the first cone assembly. One of the cone assemblies rotates relative the other. The cone assemblies have opposing surfaces. A plurality of crumber blades are connected to one of the opposing surfaces and a plurality of beads are attached to the other opposing surface. The crumber blades are in close proximity to said beads without contacting said beads as the one cone assembly rotates relative to the other cone assembly.

Tire chips are fed between the truncated cones. The close proximity of the crumber blades and the beads as the second cone assembly rotates tears the rubber from the tire chips to make crumb rubber.

BRIEF DESCRIPTION OF THE DRAWINGS

In order to more fully understand the drawings referred to in the detailed description of the present invention, a brief description of each drawing is presented, in which.

DETAILED DESCRIPTION OF THE INVENTION

Figure 1:
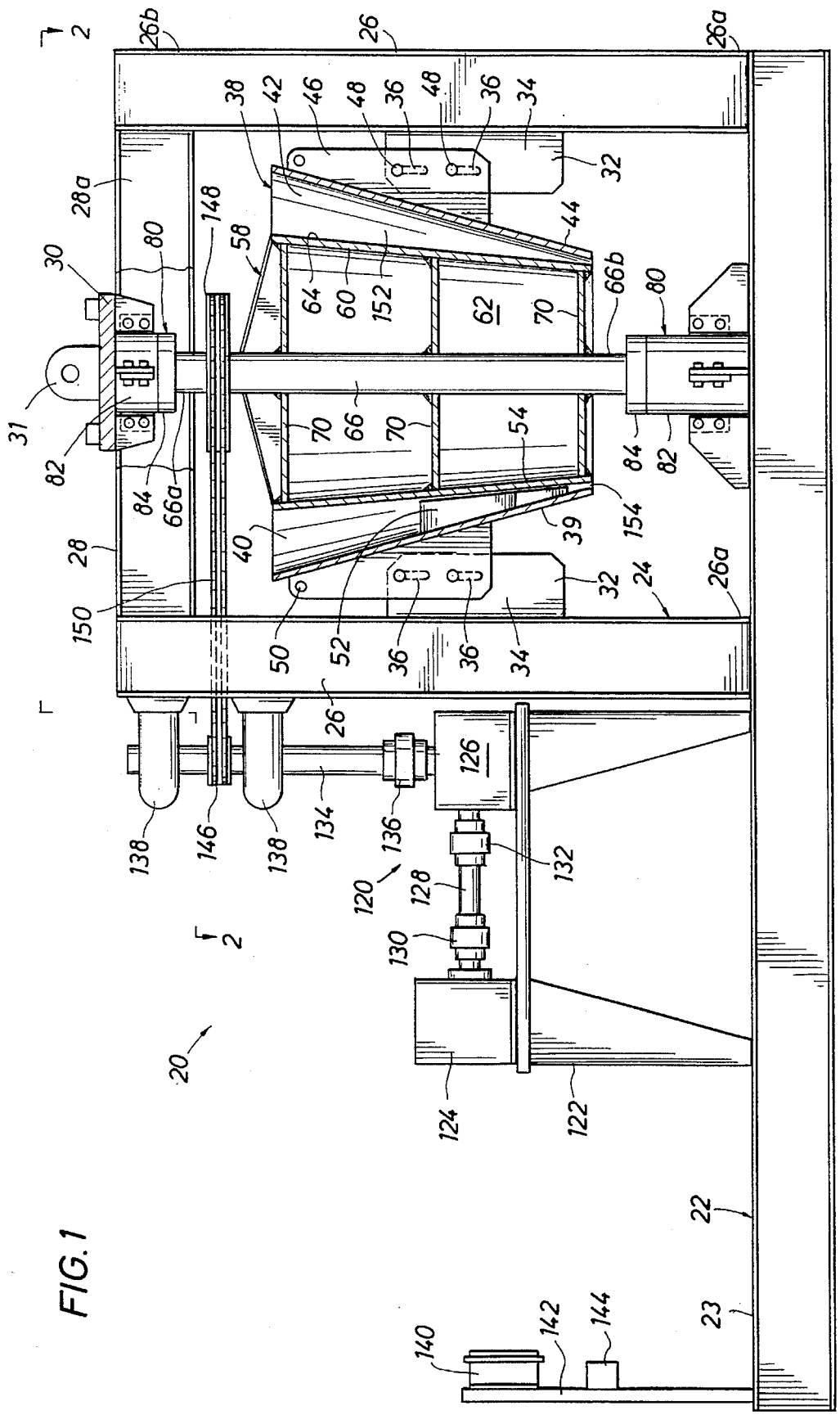
FIG. 1 is a side elevation view, partially in section, of the rubber crumbing apparatus of the present invention.
Figure 2:
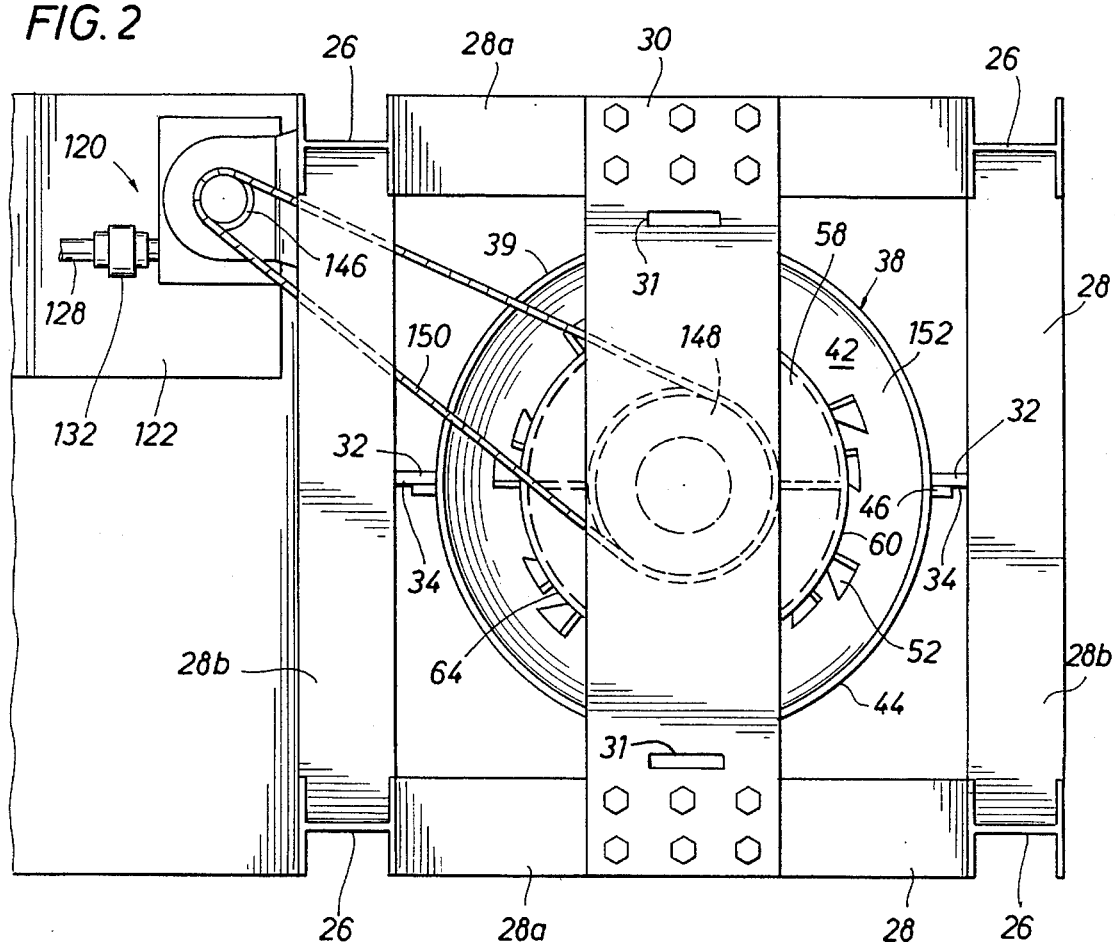
FIG. 2 is a view taken along line 2—2 of FIG. 1.

Referring to FIG. 1, a rubber crumbing apparatus, designated generally as reference numeral 20, includes a structural skid platform assembly 22 comprised of a plurality of longitudinal H-beams 23 spaced parallel to one another and rigidly interconnected with transverse support beams (not shown). An upright frame assembly 24 is rigidly mounted to one end of the structural skid platform assembly 22 as shown in FIG. 1. The frame assembly 24 is comprised of a plurality of upright frame members 26. The upright frame members 26 are connected at their lower ends 26a to the structural skid platform assembly 22. The upper ends 26b of the upright frame members 26 are connected to horizontal frame members 28 as shown in FIGS. 1 and 2. A first pair 28a of horizontal frame members 28 is aligned with the longitudinal H-beams 23 of the skid platform assembly 22 and a second pair 28b of horizontal frame members 28 is transverse thereto. In the preferred embodiment, the upright and horizontal frame members 26 and 28, respectively, are H-beams. The crumber frame assembly 24 forms a rigid box-like structure.

Referring to FIGS. 1 and 2, a pair of upright adjustment plates 32 are secured to the crumber frame assembly 24. The adjustment plates 32 include a bracket portion 34 which extends into the box-like structure. As shown in FIG. 1, each bracket portion 34 includes a pair of elongated slots 36 in vertical alignment for reasons which will be explained below.

Referring to FIGS. 1 and 2, a bearing mounting plate 30 spans across the first pair 28a of horizontal frame members 28. Preferably, the bearing mounting plate 30 is centrally located on the first pair 28a of horizontal frame members 28. In the preferred embodiment, the bearing mounting plate 30 is removably connected to the crumber frame assembly 24, as for example, by bolts and nuts.

Figure 3:
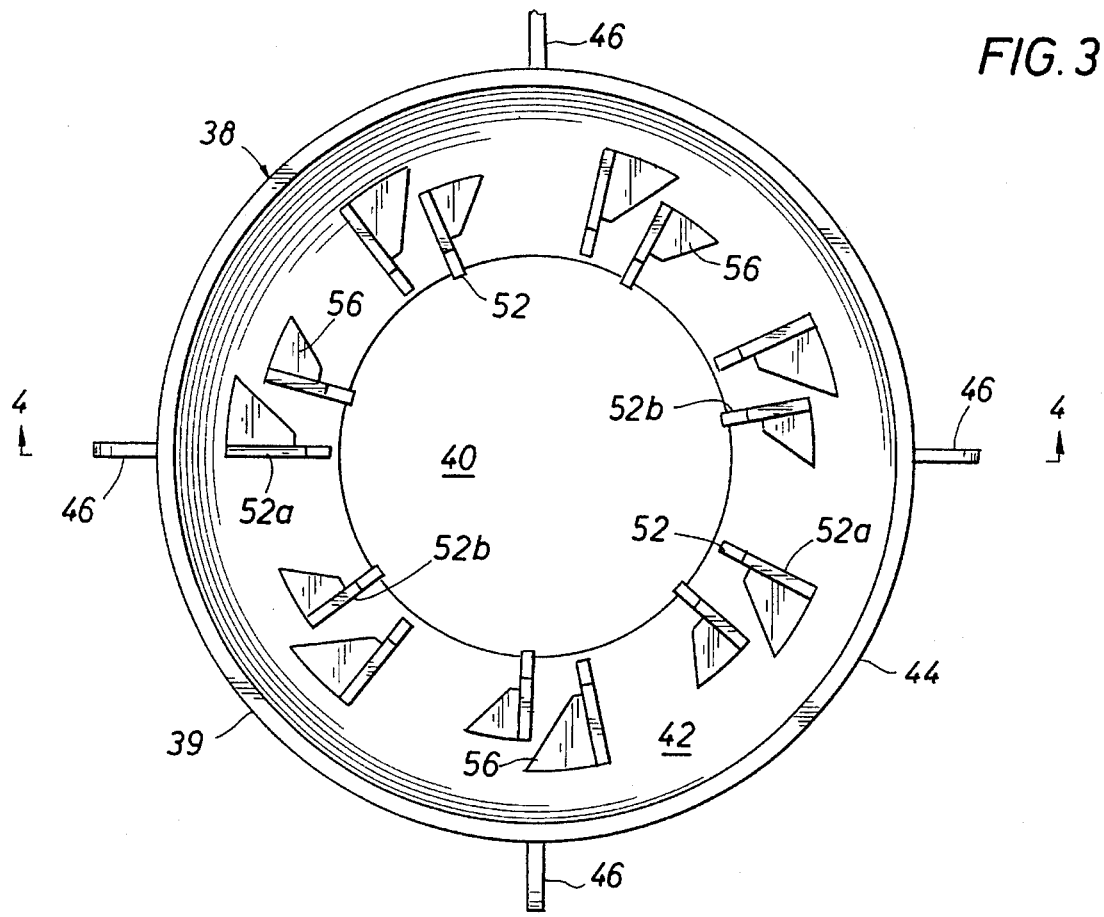
FIG. 3 is a plan view of the outer cone assembly.
Figure 4:
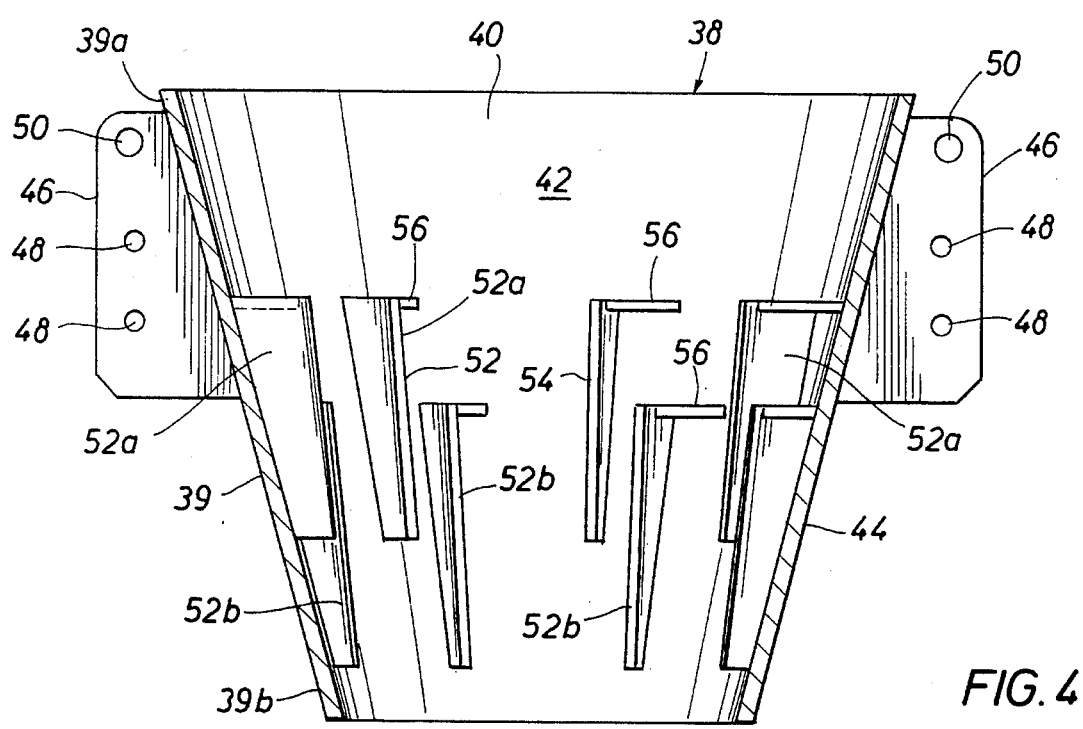
FIG. 4 is view taken along line 4—4 of FIG. 3.

Referring to FIGS. 1–4, the rubber crumbing apparatus 20 includes an outer truncated cone assembly 38. The outer truncated cone assembly 38 includes an outer truncated cone 39 having a tapered bore 40 extending therethrough. As shown in FIG. 4, the outer truncated cone 39 has an upper end 39a and a lower end 39b. The upper end 39a has a larger diameter than the lower end 39b. The outer cone assembly 38 has an interior surface 42 and an exterior surface 44. A plurality of lifting lugs 46 are attached to the exterior surface 44 of the outer cone assembly 38. In the preferred embodiment, four lifting lugs 46 are spaced equidistantly around the periphery of the outer cone assembly 38 as shown in FIG. 3. Referring to FIG. 4, each lifting lug 46 includes a pair of holes 48 extending through the lifting lug 46 and in vertical alignment with one another. The pair of holes 48 in each lifting lug 46 align with the pair of elongated slots 36 in the adjustment plates 32. Preferably, threaded fasteners are inserted through the aligned hole 48 and the elongated slot 36 and tightened to secure the relative elevation of the outer cone assembly 38 within the crumber frame assembly 24. The elongated slots 36 provide vertical adjustment of the outer cone assembly 38 for reasons which will be explained below.

Referring to FIGS. 1 and 4, each lifting lug 46 includes an upper lift hole 50 for receiving lifting means to raise and lower the outer cone assembly 38 with winches or other hoisting means.

Referring to FIGS. 3 and 4, a plurality of crumber blades 52 are connected to the interior surface 42 of the outer cone assembly 38. Preferably, there are a plurality of sets of crumber blades 52, with each set being at a predetermined height relative to the outer cone assembly 38. For example, with reference to FIG. 4, a first set of crumber blades at a first height have been designated as 52a and a second set of crumber blades at a second height as 52b.

The crumber blades 52 have an edge face 54 which aids in the rubber crumbing process which will be explained below. Preferably, the crumber blades 52 include a gusset plate 56 for increased lateral stiffening of the crumber blade 52. In the preferred embodiment, the edge face 54 of each crumber blade 52 is maintained at a substantially uniform distance from an exterior surface 64 of an inner truncated cone assembly 58. Similarly, in the preferred embodiment, all of the edge faces 54 in a given set 52a or 52b of crumber blades 52 are maintained at a substantially uniform distance from the opposing exterior surface 64 of the inner truncated cone assembly 58.

Preferably, the substantially uniform distance between the edge face 54 and the exterior surface 64 of the inner truncated cone assembly 58 is the same for both of the sets 52a and 52b of crumber blades 52. It may be desirable that the upper set 52a of crumber blades 52 have a substantially uniform distance between the edge face 54 and the exterior surface 64 of the inner truncated cone assembly 58 slightly greater than that of the lower set 52b.

Figure 5:
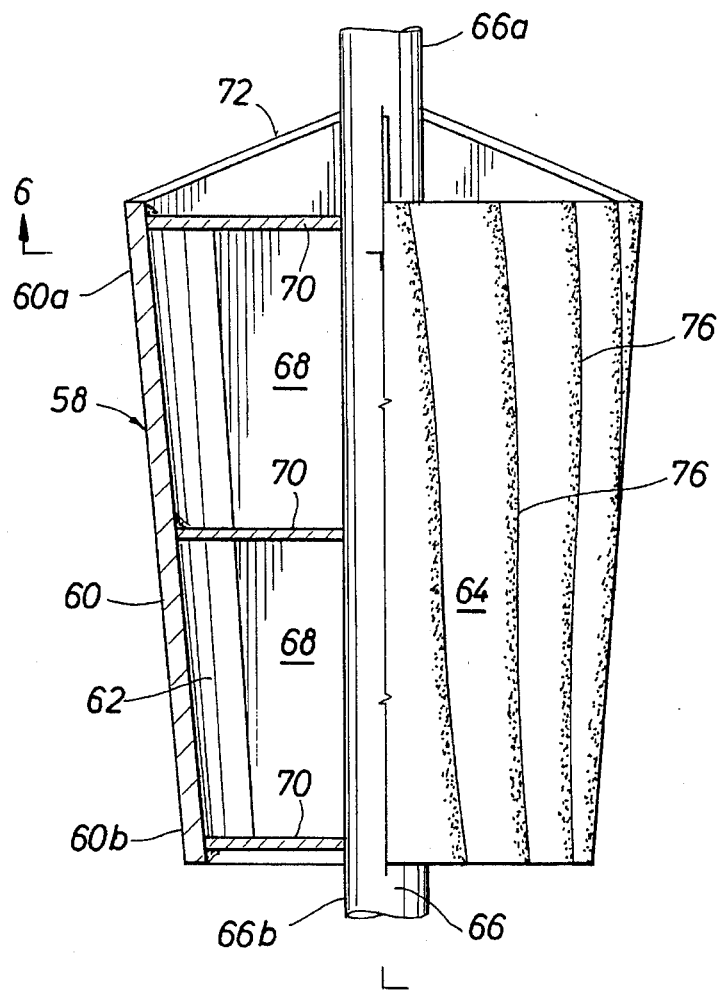
FIG. 5 is an elevational view, partially in section, of the inner cone assembly.

The inner truncated cone assembly 58 will be described with reference to FIGS. 1, 2, 5 and 6. As shown in FIG. 5, the inner truncated cone assembly 58 includes an inner truncated cone 60 having an upper end 60a and a lower end 60b. The upper end 60a has a larger diameter than the lower end 60b. It is contemplated that the inner truncated cone 60 could alternatively be a cylinder. The inner truncated cone 60 has an interior surface 62 and an exterior surface 64. A spindle shaft 66 extends through the inner truncated cone assembly 58. The spindle shaft 66 is affixed to the inner truncated cone 60 with a plurality of web plates 68. The web plates 68 maintain the spindle shaft 66 on the longitudinal axis of the inner truncated cone assembly 58. A plurality of horizontal stiffener plates 70 are also affixed to the interior surface 62 of the truncated cone 60 and are further affixed to the spindle 66. The horizontal stiffener plates 70 help to maintain the roundness of the inner truncated cone 60. As described above, it is to be understood that the inner truncated cone 60 is securely connected to the spindle shaft 66, and thus rotates as the spindle shaft 66 rotates.

Referring to FIGS. 1, 2 and 5, a closure guard 72 is mounted to the upper end 60a of the inner truncated cone 60 and to the spindle shaft 66. The closure guard 72 prevents the accumulation of shredded tire chips on top of the inner truncated cone assembly 58.

Figure 6:
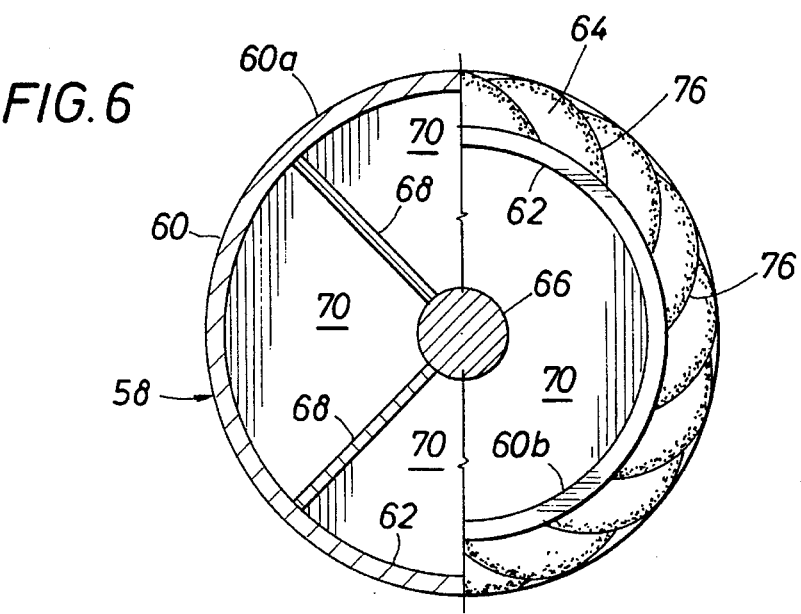
FIG. 6 is a view taken along line 6—6 of FIG. 5.

Referring to FIGS. 5 and 6, the exterior surface 64 of the inner truncated cone 60 includes a plurality of equidistantly-space beads or ridges 76 spanning from the upper end 60a of the inner truncated cone 60 to the lower end 60b of the inner truncated cone 60. Preferably, the beads 76 are weld beads formed on the exterior surface 64, as for example, a ⅛th inch stellite weld bead. In the preferred embodiment, the beads 76 preferably form an angle of approximately 6 degrees though it is contemplated that angles between 3 to 10 degrees with respect to a vertical plane passing through the longitudinal axis of the inner truncated cone 60 could be used.

Referring to FIG. 1, an upper end 66a of the spindle shaft 66 is rotatably mounted to the bearing mounting plate 30 by means of a spindle shaft bearing assembly 80. A lower end 66b of the spindle shaft 66 is mounted with a similar spindle shaft bearing assembly 80. The spindle shaft bearing assembly 80 at the lower end 66b of the spindle shaft 66 is mounted to the structural skid platform assembly 22.

The spindle shaft bearing assembly 80 will be described in detail with reference to FIG. 7. It is to be understood that both the upper and the lower spindle shaft bearing assemblies 80 will be described with reference to FIG. 7 due to their similarities. The spindle shaft bearing assembly 80 includes a bearing cup housing 82, a housing cover 84, a radial bearing 86, a split keeper ring 88, a thrust ring 90, and a ball thrust bearing 92. The bearing cup housing 82 includes first and second recessed portions 94 and 96, respectively, and a plurality of circumferentially-spaced threaded blind bores 98. The housing cover 84 includes a plurality of circumferentially-spaced bores 100 adapted to align with threaded blind bores 98 of the bearing cup housing 82. The housing cover 84 is secured to the bearing cup housing 82 with a plurality of threaded fasteners or bolts 102 inserted through the bores 100 and threadably engaged with the threaded blind bores 98 of the bearing cup housing 82.

Figure 7:
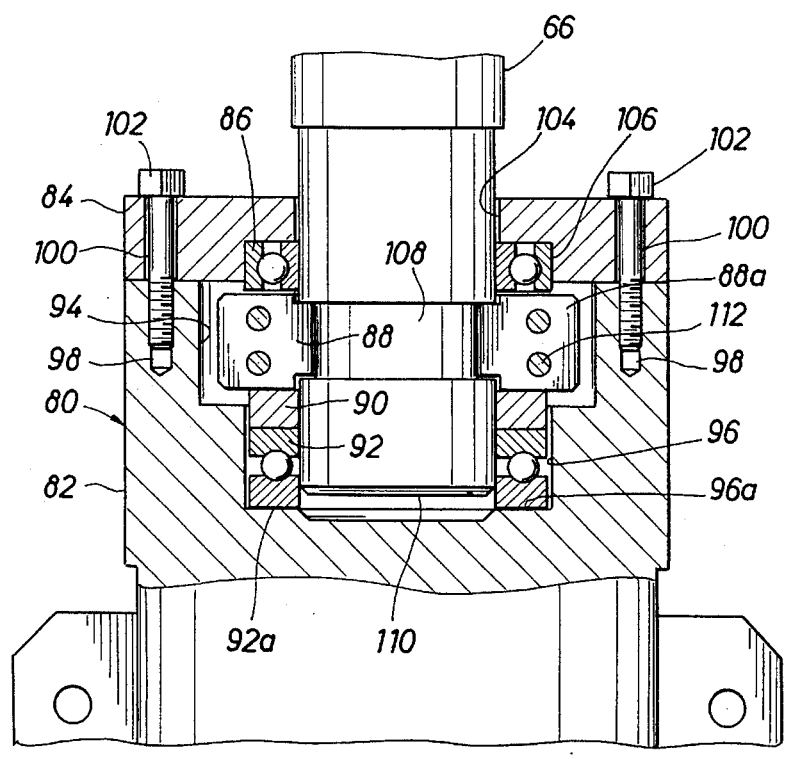
FIG. 7 is an elevational view, partially in section, of the inner cone assembly shaft bearing.

Referring still to FIG. 7, the housing cover 84 includes a bore 104 therethrough having a radial bearing seat portion 106. The spindle shaft 66 includes a circumferentially-grooved keeper portion 108 of reduced diameter at a location near, but not at, the end 110 of the spindle shaft 66.

The split keeper ring 88 includes a pair of mating ring halves 88a adapted to be joined by threaded fasteners 112 to form a continuous ring. The split keeper ring 88 has an inside diameter substantially the same or slightly greater than the reduced diameter of the grooved keeper portion 108. The height of the split keeper ring 88 at the inside diameter is substantially the same or slightly less than the height of the grooved keeper portion 108.

The spindle shaft bearing assembly 80 is assembled by sliding housing cover 84 and the radial bearing 86 onto the end 110 of the spindle shaft 66. The split keeper ring halves 88a are assembled around the grooved keeper portion 108. The thrust ring 90 and the ball thrust bearing 92 are slid onto the end 110 of the spindle shaft 66.

With the ball thrust bearing 92, the thrust ring 90, the split keeper ring 88, and the end 110 in the recessed portions 94 and 96 of the bearing cup housing 82, the housing cover 84 is bolted to the bearing cup housing 82.

Referring to FIG. 7, the spindle shaft bearing assembly 80 provides a load supporting, rotatable bearing. With reference to the spindle shaft bearing assembly 80 at the lower end 66b of the spindle shaft 66, the downward load of the inner truncated cone assembly 58 is transferred from the spindle shaft 66 to the split keeper ring 88 and the thrust ring 90 and then to the ball thrust bearing 92. A lower face 92a of the ball thrust bearing 92 bears against an end face 96a of the second recessed portion 96 of the bearing cup housing 82. The thrust ring 90 is compressed between the split keeper ring 88 and the ball thrust bearing 92. As shown in FIG. 7, the end 110 of the spindle shaft 66 is maintained a slight distance off of the end face 96a of the bearing cup housing 82. The ball thrust bearing 92 freely fits within the second recessed portion 96. The thrust ring 90 also freely fits within the second recessed portion 96 and aids in maintaining the verticality of the inner truncated cone assembly 58. It is also to be understood that the split keeper ring 88 freely fits within the first recessed portion 94 and the radial bearing 86 freely fits within the seat portion 106 of the housing cover 84.

It is to be understood that in the preferred embodiment, the spindle shaft bearing assembly 80 is formed without press-fitting any of the components onto the spindle shaft 66. The bearing assembly components are all loose fitting. This enables repair or replacement of the spindle shaft bearing assemblies 80 to take place in the field without the specialized tools required to install or remove a press-fit bearing onto a shaft. Additionally, the spindle shaft bearing assembly 80 has no keys and keyways or snap rings. Keys and/or snap rings oftentimes make repairs or replacement more difficult.

The radial bearing 86 and the ball thrust bearing 92 are commercially available. The radial bearing 86 is available from Fafnir #9128K of Dallas, Tex. and the ball thrust bearing 92 is available from Andrews No. W-5½ of Spartanburg, S.C.

Referring to FIGS. 1 and 2, a power drive assembly 120 for rotating the inner truncated cone assembly 58 will be described in detail. A drive table 122 is secured, preferably by welding, to the skid platform assembly 22. A motor 124, preferably an electric motor, is mounted to the drive table 122. The motor 124 is electrically connected to a junction box 140 mounted to an upright support 142. In the preferred embodiment, a bi-direct switch 144 is installed adjacent to the junction box 140 to permit reversal of the direction of the motor 124. The motor 124 is connected to an input of the gear reducer 126 by a first drive shaft 128 and two roller chain flex couplings 130 and 132. Referring to FIG. 1, a second drive shaft 134 and a roller chain flex coupling 136 are connected to an output of the gear reducer 126. The second drive shaft 134 is further supported by a pair of pillow blocks 138 mounted to the crumber frame assembly 24.

Referring to FIGS. 1 and 2, a chain drive sprocket 146 is mounted on the second drive shaft 134. The drive sprocket 146 is not free to rotate relative to the second drive shaft 134. A chain main sprocket 148 is mounted on the upper end portion 66b of the spindle shaft 66. The main sprocket 148 is not free to rotate relative to the spindle shaft 66. An endless chain 150, preferably an endless roller chain, is installed on the drive and main sprockets 146 and 148, respectively.

Referring to FIGS. 1 and 2, preferably the bearing mounting plate 30 includes a pair of lifting eyes 31 to facilitate the lowering of the inner truncated cone assembly 58 into the outer truncated cone assembly 38 or removing therefrom.

Figure 8:
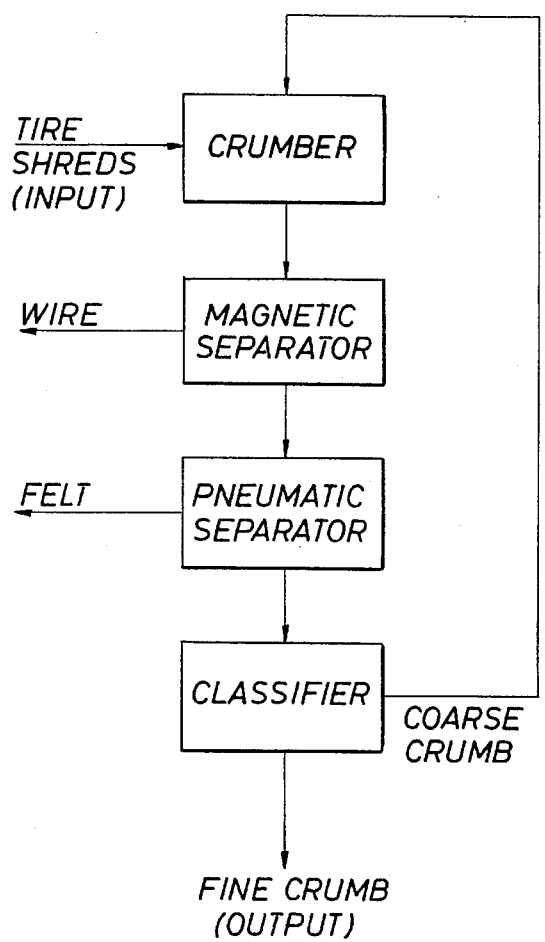
FIG. 8 is a schematic diagram of a first embodiment of the rubber crumbing system according to the present invention.
Figure 9:
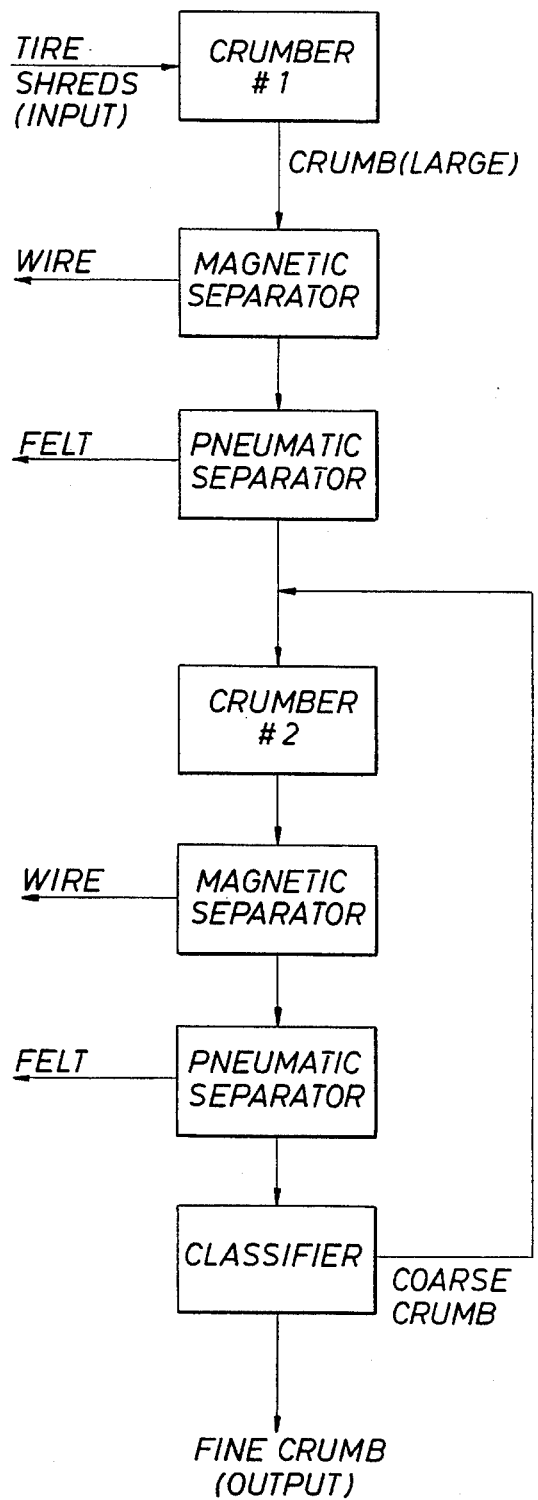
FIG. 9 is a schematic diagram of a second embodiment of the rubber crumbing system according to the present invention.

Referring to FIGS. 8 and 9, a rubber crumbing system incorporating the rubber crumbing apparatus 20 has been designed as above described to have a production throughput of approximately 10,000 pounds of shredded tire chips per hour with the tire chips being no larger than approximately 3 inches by 3 inches. The resulting crumb rubber will be able to pass through a 10-mesh screen or finer.

The rubber crumbing apparatus 20 designed to meet the above requirements will now be described in greater detail. Preferably, the inner and outer truncated cones 60 and 39, respectively are made of 1½ inch thick steel plate. The outer truncated cone 39 is tapered at an angle of approximately 15 degrees with respect to its longitudinal axis, has a height of approximately 4 feet and an upper diameter of approximately 56 inches. The inner truncated cone 60 is tapered at a lesser angle of approximately 5 degrees with respect to its longitudinal axis, has a height of approximately 4 feet and an upper diameter of approximately 38 inches. The internal diameter of the outer truncated cone 39 at its lower end 39b is approximately ½ inch greater than the external diameter of the inner truncated cone 60 at its lower end 60b. There are approximately 16 weld beads 76 equally spaced around the inner truncated cone 60. The weld beads 76 are at an angle of approximately 6 degrees with respect to a vertical plane passing through the longitudinal axis of the inner truncated cone 60. Preferably, the spindle shaft 66 has an outer diameter of 6 inches.

The crumber blades 52 are sized and located such that the edge face 54 is approximately 3/16 inch from the outermost portion of the weld beads 76 when the outer truncated cone assembly 38 is in its uppermost position. In the lowermost position, the blades 52 are located 1/64 inch from the outermost portion of the weld beads 76. It is important that the weld beads 76, which are extremely hard, not contact the crumber blades 52 as the inner truncated cone assembly 58 rotates. The edge face 54 is at an angle of approximately 5 degrees with respect to the longitudinal axis of the outer truncated cone 39, and thus, parallel to the opposing surface of the inner truncated cone 60. Preferably, 7 crumber blades 52 are in each set 52a or 52b.

It is to be understood that the clearance between the edge face 54 and the weld bead 76 increases as the outer truncated cone assembly 38 is lowered relative to the inner truncated cone assembly 58. This feature allows for adjusting the desired particle size of the crumb rubber.

The motor 124 is preferably a 150 horsepower, direct current drive electric motor which is commercially available from Reliance Electric of Beaumont, Tex., Model No. P44G5657. The gear reducer 126 is preferably a 10:1 gear reducer which will reduce an inlet of approximately 120 revolutions per minute (rpm) to an outlet of approximately 12 rpm. The gear reducer 126 is commercially available from Grant Gears of Boston, Mass., Model No. 600 ST and 600 SV. The roller chain flex couplings 130, 132, and 136 are commercially available from Morse #DRC10020FB of Ithaca, N.Y. The pillow blocks 138 are 5 inch diameter, straight bore pillow blocks commercially available from SKF #SAF-222 of King of Prussia, Pa.

Preferably, the endless roller chain 150 installed on the drive and main sprockets 146 and 148, respectively, is an ANSI No. 80 double strand roller chain having a 1 inch pitch. The drive and main sprockets 146 and 148, respectively, have outside diameters of approximately 8 inches and 24 inches, respectively, and are No. 80-2 double steel sprockets. The roller chain 150, drive sprocket 146, and main sprocket 148 are commercially available from Morse #D80C76 of Ithaca, N.Y.

Operation of the Present Invention

The operation of the rubber crumbing apparatus 20 and the rubber crumbing system will now be described with reference to FIGS. 1, 2, 8 and 9. FIGS. 8 and 9 are schematic diagrams illustrating first and second embodiments of the rubber crumbing system.

The rubber crumbing apparatus 20 has been specifically designed to process shredded steel belted vehicle tires into crumb rubber from shredded tire chips no larger than approximately 3 inches by 3 inches for a production throughput of 10,000 pounds of 10-mesh size crumb rubber or finer per hour. The tire chips can be wet or dry. Preferably, a metered conveyor system provides the tire chips to the opening at the upper end 39a of the outer truncated cone 39. The inner truncated cone assembly 58 rotates at approximately 10 rpm. It is anticipated that the size of the main sprocket 148 can be replaced with another sprocket to produce a different speed of the inner truncated cone assembly 58. This will permit the motor 124 to always operate at or near its highest efficiency level.

The tire chips are gravity fed in the annular space 152 (FIGS. 1 and 2) between the outer and inner truncated cone assemblies 38 and 58, respectively. The tire chips fall freely until their physical size prevents further downward movement. The weld beads 76 (FIGS. 5 and 6) on the rotating inner truncated cone assembly 60 force the tire chips towards the crumber blades 52. As the weld bead 76 passes by the crumber blade 52, small pieces are torn off of the edges of the tire chips. The small pieces fall down through a bottom annulus 154 (FIG. 1). This tearing process contin- ues until the tire shreds have been reduced to a size allowing the pieces to fall through the bottom annulus 154.

It is important to understand that the tearing process does not rely on sharp edges for cutting which would dull with time and thus impair the efficiency of the rubber crumbing apparatus 20. Rather, the tearing process is very mechanically efficient.

Referring to FIGS. 8 and 9, the small pieces from the rubber crumbing apparatus 20 are then passed through a magnetic separator to separate the separated steel particles. The magnetic separator is preferably a drum-type magnetic separator. After the separated steel particles have been removed in the magnetic separator, the remaining small pieces are passed through a pneumatic separator to remove the separated fiber or felt particles.

Referring to FIG. 8, the particles remaining after passing through the pneumatic separator are passed through a classifier. The classifier includes the appropriate sized mesh screen and allows the fine crumb rubber to pass to a conveyor for finished crumb rubber product and recirculates the coarse crumb and particles to the rubber crumbing apparatus (crumber) for another cycle through the system.

Alternatively, the rubber crumbing system could include a second set of processing equipment as shown in FIG. 9. As shown in FIG. 9, after passing through a first pneumatic separator, the small pieces are fed into a second crumber, similar to the first crumber. It may be desirable to have the second crumber produce smaller pieces than the first crumber. The pieces are once again passed through magnetic and pneumatic separators before being passed through a classifier. The classifier allows the fine crumb rubber to pass to a conveyor for finished crumb rubber product and recirculates the coarse crumb and particles to the second crumber for another cycle through the second set of equipment.

It is to be understood that the rubber crumbing system can be configured in a variety of ways depending upon the throughput and backup desired for the system. For example, a third or fourth rubber crumbing apparatus 20 along with its magnetic separator and pneumatic separator could be used to achieve the desired throughput and backup. It is understood that the initial rubber crumbing apparatus could be adjusted so that larger crumbs would result from use of apparatus and that the final rubber crumbing apparatus would be adjusted for finer resulting crumbs.

Also, though not shown, a rubber crumbing apparatus 20 could be used at the end of a prior art two-roll grooved rubber mill crumbing system or other prior art systems to increase the efficiency of these systems.

The foregoing disclosure and description of the invention is illustrative and explanatory thereof, and various changes in the size, shape, and materials, as well as in the details of illustrative construction and assembly, may be made without departing from the spirit of the invention.

I claim:

1. A rubber crumbing apparatus for making crumb rubber from tire chips, the rubber crumbing apparatus comprising:

a frame assembly;

a first cone assembly having an opening extending therethrough, said first cone assembly supported by said frame assembly;

a second cone assembly supported by said frame assembly, said second cone assembly fitting substantially within said first cone assembly, wherein said first cone assembly includes an inverted truncated cone having an interior surface and said second cone assembly includes an inverted truncated cone having an exterior surface, wherein said interior and exterior surfaces are in opposing relationship to one another;

means for rotating one said cone assembly relative to said other cone assembly;

a plurality of crumber blades connected to one of said opposing surfaces of said truncated cones; and a plurality of beads welded to said other opposing surface wherein said blades and said beads tear the rubber from the tire chips.

2. The rubber crumbing apparatus of claim 1, wherein said crumber blades are in close proximity to said beads without contacting said beads as one said cone assembly rotates relative to said other cone assembly.

3. The rubber crumbing apparatus of claim 1, wherein said first cone has an angle of taper greater than said second cone.

4. The rubber crumbing apparatus of claim 1, wherein each of said inverted truncated cones has an upper end and a lower end and an annular space is formed between said inverted truncated cones, wherein the cross-sectional annular space at said upper end of said inverted truncated cones is substantially greater than the cross-sectional annular space at said lower end of said inverted truncated cones.

5. The rubber crumbing apparatus of claim 1, wherein said second cone assembly is rotatably mounted to said frame assembly.

6. The rubber crumbing apparatus of claim 5, wherein said first cone assembly is non-rotatably mounted to said frame assembly.

7. The rubber crumbing apparatus of claim 1, further comprising means for adjusting one of the cone assemblies relative to the other cone assembly.

8. A rubber crumbing apparatus for making crumb rubber from tire chips, the rubber crumbing apparatus comprising:

a frame assembly;

a first cone assembly including a truncated cone having an interior surface and an opening extending therethrough, said first cone assembly supported by said frame assembly;

a second cone assembly supported by said frame assembly and positioned substantially within said first cone assembly, said second cone assembly including a truncated cone having an exterior surface, wherein said interior and exterior surfaces are in opposing relationship to one another;

means for rotating one said cone assembly relative to said other cone assembly; and means for tearing the tire chips into crumb rubber comprising a plurality of crumber blades connected to one of said opposing surfaces of said truncated cones; and a plurality of beads welded to said other opposing surface.

9. The rubber crumbing apparatus of claim 8, wherein said crumber blades are in close proximity to said beads without contacting said beads as one said cone assembly rotates relative to said other cone assembly.

10. The rubber crumbing apparatus of claim 8, wherein said first cone has an angle of taper greater than said second cone.

11. The rubber crumbing apparatus of claim 8, wherein each of said truncated cones has an upper end and a lower end and an annular space is formed between said truncated cones, wherein the cross-sectional annular space at said upper end of said truncated cones is substantially greater than the cross-sectional annular space at said lower end of said truncated cones.

12. The rubber crumbing apparatus of claim 8, wherein said second cone assembly is rotatably mounted to said frame assembly.

13. The rubber crumbing apparatus of claim 12, wherein said first cone assembly is non-rotatably mounted to said frame assembly.

14. The rubber crumbing apparatus of claim 8, further comprising means for adjusting one of the cone assemblies relative to the other cone assembly.

15. The rubber crumbing apparatus of claim 14, wherein said adjusting means comprises means for altering the spacing between said crumber blades and said beads.

16. The rubber crumbling apparatus of claim 15, wherein the spacing between said crumber blades and said beads is altered by adjusting the vertical relationship between said truncated cones.

17. A rubber crumbing apparatus for making crumb rubber from tire chips, the rubber crumbing apparatus comprising:

a frame assembly;

a first cone assembly including a truncated cone having an interior surface and an opening extending therethrough, said first cone assembly supported by said frame assembly;

a second cone assembly supported by said frame assembly and positioned substantially within said first cone assembly, said second cone assembly including a truncated cone having an exterior surface, wherein said interior and exterior surfaces are in opposing relationship to one another;

means for rotating one said cone assembly relative to said other cone assembly; and a plurality of crumber blades connected to one of said surfaces and a plurality of beads welded to said other surface for tearing the tire chips into crumb rubber.

18. The rubber crumbing apparatus of claim 17, wherein said first cone has an angle of taper greater than said second cone.

* * * * *